3,112,309
AMIDES OF PHENOTHIAZINECARBOXYLIC ACIDS
John W. Cusic, Skokie, and Harman S. Lowrie, Northbrook, Ill., assignors to G. D. Searle & Co., Chicago, Ill., a corporation of Delaware
No Drawing. Filed Jan. 15, 1962, Ser. No. 166,402
4 Claims. (Cl. 260—243)

The present invention relates to a novel group of compounds which are amides of phenothiazinecarboxylic acids. More particularly, it relates to compounds having the following formula

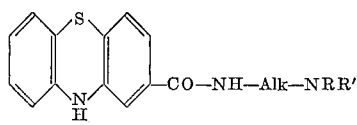

wherein Alk is a lower alkylene radical and R and R' are lower alkyl radicals. The lower alkylene radicals referred to above are bivalent, saturated, acyclic, straight- or branched-chain hydrocarbon radicals containing up to 6 carbon atoms. Typical examples of such radicals are ethylene, trimethylene, propylene, and tetramethylene. The lower alkyl radicals referred to above are straight- or branched-chain hydrocarbon radicals containing up to 6 carbon atoms and thus include methyl, ethyl, propyl, isopropyl, butyl, and like lower alkyl radicals.

Equivalent to the basic amines of this invention for the purposes here described are their non-toxic acid addition salts and quaternary ammonium salts. Such salts are formed with a variety of inorganic and strong organic acids including sulfuric, phosphoric, hydrochloric, citric, maleic, and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfonate, ethylene chlorohydrin, and allyl bromide.

The compounds of this invention are useful because of their valuable pharmacological properties. Thus, the present compounds show anti-inflammatory activity which is particularly demonstrated by their phenylbutazone-like effect on edematous conditions.

In the preparation of the compounds of the present invention, esters of phenothiazine carboxylic acids are convenient starting materials. Thus, an ester of the formula

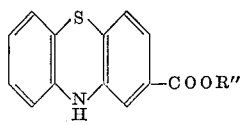

wherein R'' is lower alkyl, preferably methyl or ethyl, is heated with an excess of the appropriate dialkylaminoalkylamine in the presence of a catalytic amount of sodium methoxide. Alternately, the above reaction can be carried out in an inert solvent such as an aromatic hydrocarbon (e.g., benzene and toluene).

The compounds which constitute this invention and their preparation will appear more fully from a consideration of the following examples which are given for the purpose of illustration only and are not to be construed as limiting the invention in spirit or in scope. In these examples quantities are indicated in parts by weight, temperatures in degrees centigrade (° C.), and pressures in millimeters of mercury (mm.).

Example 1

A mixture of 9.1 parts of 2-carbomethoxyphenothiazine, 50 parts by volume of β-dimethylaminoethylamine, and 0.1 part of sodium methoxide is refluxed for 4 hours. The excess amine is evaporated from the reaction mixture under reduced pressure and the residue is dissolved in dilute hydrochloric acid. The acidic solution is washed once with ether and then made strongly alkaline. The resultant alkaline mixture is extracted with ether and the ether extracts are washed with water and dried and the solvent is evaporated. Recrystallization of the residue from a mixture of benzene and petroleum ether gives 2-[N - (β - dimethylaminoethyl)carbamyl]phenothiazine melting at about 147–149° C. This compound has the following formula

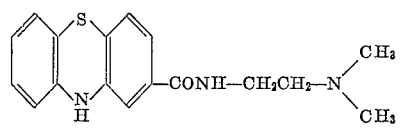

Example 2

If an equivalent quantity of β-diethylaminoethylamine is substituted for the β-dimethylaminoethylamine and the procedure of Example 1 is repeated, the product is 2-[N-(β - diethylaminoethyl)carbamyl] - phenothiazine. This compound has the following formula

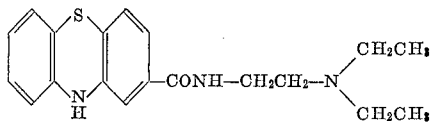

Example 3

If an equivalent quantity of γ-dimethylaminopropylamine is substituted for the β-dimethylaminoethylamine and the procedure of Example 1 is repeated, the product is 2-[N-(γ-dimethylaminopropyl)carbamyl]phenothiazine melting at about 147–149° C. This compound has the following formula

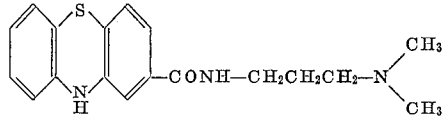

Example 4

Substitution of an equivalent quantity of γ-diethylaminopropylamine for the β-dimethylaminoethylamine called for in Example 1 affords, by the procedure there described, 2-[N-(γ-diethylaminopropyl)-carbamyl]phenothiazine. This compound has the following formula

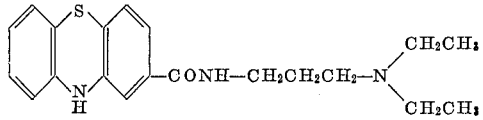

What is claimed is:
1. A compound of the formula

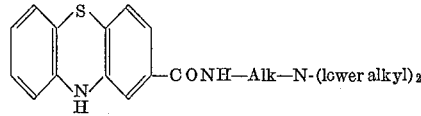

wherein Alk is lower alkylene containing more than one carbon atom and separating the radicals attached thereto by at least 2 carbon atoms.

2. A compound of the formula
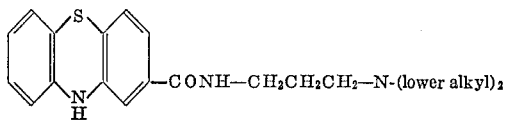
3. 2 - [N-(γ-dimethylaminopropyl)carbamyl] - phenothiazine.
4. 2 - [N - (β - dimethylaminoethyl)carbamyl] - phenothiazine.
References Cited in the file of this patent
UNITED STATES PATENTS
2,956,996    Craig _____ Oct. 18, 1960
FOREIGN PATENTS
203,503    Austria _____ May 25, 1959